July 24, 1956 R. SMET 2,755,861
METHOD OF AND APPARATUS FOR SINKING GRAVEL FILTER BED WELLS
Filed Aug. 25, 1952
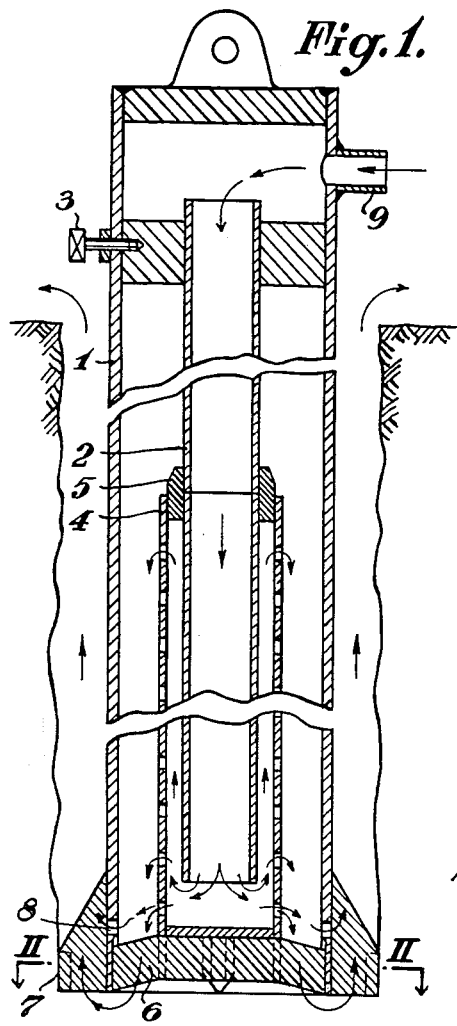
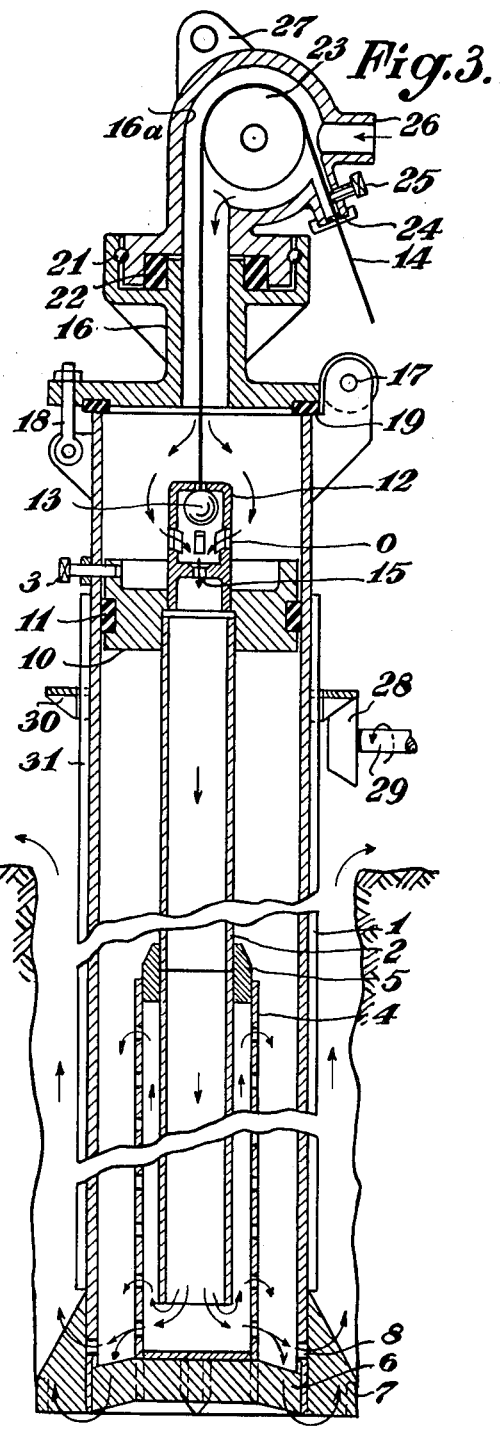
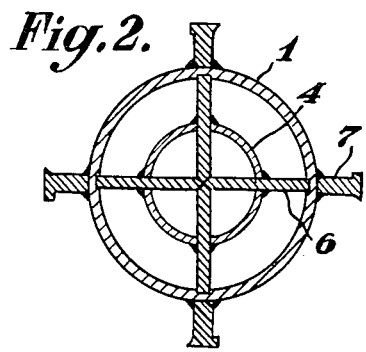
Inventor
René Smet
by Stevens, Davis, Miller & Mosher
his attorneys

United States Patent Office 2,755,861
Patented July 24, 1956

2,755,861

METHOD OF AND APPARATUS FOR SINKING GRAVEL FILTER BED WELLS

Rene Smet, Dessel, Belgium

Application August 25, 1952, Serial No. 306,251

Claims priority, application Germany August 29, 1951

8 Claims. (Cl. 166—18)

This invention relates to a new method and apparatus for sinking tubular wells, especially gravel bed filter wells and has for its object to achieve the sinking of such wells by the use of means which are as simple as possible, in a short time and with the highest possible safety.

According to this invention, a borehole is formed in the ground by means of a drilling tube which has outwardly projecting blades on its lower end, a well pipe of substantially smaller diameter being coaxially arranged within the drilling tube with water under pressure being injected from the well pipe outwardly of the drilling tube at the lower end thereof as gravel is poured into the space between the drilling tube and the side wall of the bore-hole in countercurrent to the uprising stream of water in such space, while simultaneously the tube is being withdrawn, preferably under rotation.

In the method according to this invention both the drilling tube and the filter tube are introduced into the bore-hole at the same time, thereby saving the extra time expenditure and labour cost in connection with subsequent lowering of the filter tube. Moreover, the gravel bed is introduced in a direction opposing that of the uprising rinsing water, so that the gravel bed is securely maintained in a perfectly clean condition. Rotation of the drilling tube during this step will result in imparting a rotary motion to the gravel bed in the course of introduction, which will in turn be effective in enlarging the diameter of the bore-hole, thus securing a larger access to the water bearing strata, while the gravel is deposited around the filter tube in uniform concentric formation.

More particularly, the method of the invention may be further improved by virtue of the fact that the withdrawal of the drilling tube is effected by the action of the rinsing pressure or with the assistance of such pressure. According to a further feature of the invention, the rinsing or injection water may have admixed therewith disinfecting additions as early as in the drilling stage, which additions are effective in disinfecting the strata around the bore-hole, thus securing a drinking water well which is fully satisfactory from a hygienical standpoint. Such added chemicals may be of any desired type and may comprise oxygen-evolving compounds such as potassium permanganate or suitable chlorine compound.

The invention has further for its object to provide the various equipments to be used in carrying out the method which forms the underlying principle thereof.

By way of example, one drilling equipment according to the invention is substantially characterized by the fact that the filter tube and the filter head tube are supported concentrically and removably within the drilling tube, the filter tube and the drilling tube being shaped at their lower ends so as to form a drill. This can be accomplished by gracing the lower end of the filter tube with respect to the drilling tube by means of drilling cutters or a drilling crown, while the drilling tube proper is provided with cutting edges at the outer face of its lower end. Moreover, the lower end portion of the filter tube may terminate in a drilling point.

Further advantageous details of the invention will appear from the accompanying drawings which illustrate the invention by way of example.

In the drawings:

Fig. 1 is a vertical sectional view of the drilling equipment of this invention, showing the same in use;

Fig. 2 is a cross-sectional view taken on line 2—2 of Fig. 1, and,

Fig. 3 is a vertical sectional view of a modified form of drilling equipment.

The device shown in Fig. 1 comprises the drilling tube 1, which is closed at its upper end. The filter head tube 2 is fastened in a secure though removable manner to the drilling tube 1 by one or more screws 3. The lower end of the tube 2 is connected to the filter tube proper 4 through the medium of the connecting member 5. The tube 2 and the filter tube proper 4 define a well pipe. In the embodiment shown in the drawings, the filter tube 4 extends downwardly for a slightly greater distance than the sand seal tube 2, the lower end of the said filter tube is provided with a drilling crown 6, the outer diameter of which corresponds to the inner diameter of the drilling tube 1, while the cutting edges are bracing the filter tube concentrically with respect to the inner wall of the drilling tube 1. Moreover, the drilling tube 1 has its lower end provided with drilling edges 7 arranged at the outer wall of the drilling tube 1, while the lower end of the filter tube is provided with a drilling point which has not been indicated. At the level of each of the drilling cutters 7, the number of which may vary between four and eight, the drilling tube is provided with radial holes 8 through which the rinsing water may pass to the drilling cutters 7 and clean them from the cuttings, while assisting the boring action. The upper end of the drill tube is further provided with a pipe connection 9 for the supply of rinsing water.

In the embodiment shown by way of example in Fig. 3 there is provided at the upper end of the tube 2 a piston 10, which may be screwed thereto, the said piston being mounted within the drill tube 1 and sealed by means of a packing 11, the said piston being further secured removably to the said drill tube by means of one or more screws 3. The piston 10 is provided with a hood 12 having arranged therein a valve in the form of a ball 13 which may be actuated by hand by means of the rope 14, so that the ball may be either lowered into its seat 15 or lifted from the latter. The hood 12 is further provided with entrance holes O for the admission of the rinsing water. At the upper end of the drill tube 1 a swivel head is provided and comprises a neck portion 16 which is attached to the drill tube 1 by means of the hinge 17 and the screw 18 and which may be sealed against the inside of the drilling tube by means of the sealing joint 19. The swivel head 16 has associated therewith an upper member 16a. Between the member 16 and the member 16a there is provided a ball bearing 21 and a stuffing box 22, while the upper member 16a is fitted inside with a rope pulley 23 around which the rope 14 is guided and from which it may be led to the outside through an opening in a connection member 24. The rope is arrested in any desired position by means of a screw 25 provided in the connection member 24. The point at which the rope enters the connection member 24 is sealed in the usual way. In the upper member 16a of the swivel head there is provided a pipe connection 26 through which the rinsing hose from the pump may be connected. Finally, the upper member 16a is fitted with an eye 27 to which a shackle and rope may be attached, by means of which the whole device may be suspended from a rope winch, the rope being guided round the pulley of a tripod.

The method of the invention will be hereinafter disclosed with reference to Fig. 3, from which disclosure the way of carrying out the method with the device according to Fig. 1 may also be derived.

After the well pipe 2 and 4 has been lowered into the drilling tube 1, the piston 10 is screwed upon the pipe 2 and is securely fastened with respect to the drilling tube by means of the screw 3. The swivel head 16, 16a is placed upon the drilling tube and fastened thereto, whereupon the whole of the device is suspended on a tripod or the like by means of a rope attached to the eye 27. Thereupon the drilling is initiated by hand or by means of a mechanical drive, i. e., the drilling tube 1 is placed, so as to rest vertically upon the drilling site, and is imparted a rotary motion, the upper member 16a of the swivel head being not rotated. One means of rotating the assembly is shown in Fig. 3, such means being exemplary only, as any conventional means may be utilized, and including a bevel gear 28 driven by a shaft 29 and meshing with a toothed crown 30, which is mounted on a fixed support and is provided with inner grooves slidably engaging outer ribs 31 on the tube 1. At the same time the ball 13 is lifted from its seat by means of the rope and rinsing water is forced through the connection 26. The water flows downwardly, in the direction of the arrows, through the openings O of the hood 12, enters the drilling tube 1 through the openings of the filter tube and arrives through the opening 8 to the drilling cutters 7, whence the rinsing water will carry away the drillings as it flows upward along the outer wall of the drilling tube 1 through the space between the wall of the bore-hole and the external surface of the tube 1.

When the bore-hole has reached the necessary depth the well pipe and the filter 2 and 4 are secured in position, by releasing the screw 3. Thereupon the drilling tube is pulled upwards which may be effected by the use, in addition to the winch of the tripod, of the piston 10, which may be achieved by lowering the rope 14 so that the ball valve 13 can rest on its seat in the hood 12, thus preventing any water from entering the tube 2 with the result that the pressure of the water will act upon the piston 10 and thus upon the inner face of the swivel head 16. After the drilling tube has been raised a sufficient distance, the ball valve 13 will again be opened in order to force water through the filter tube 4 with the object of carrying upwardly any debris that may have formed during the lifting of the drilling tube 1. As soon as this has occurred, the gravel is poured into the space between the bore-hole wall and the external surface of the tube 1 in countercurrent to the uprising stream of rinsing water, the amount of which may be reduced if desired, while getting on with the withdrawal of the drilling tube 1 and, preferably, imparting a rotary motion thereto. After the well has been provided with a gravel bed in the area of the water bearing strata in the aforedescribed manner, the drilling or sinking tube 1 is fully withdrawn and the well is finished in the usual way.

The invention makes it possible, by using the above described method or a similar method, to build gravel filter bed wells with the smallest possible labor cost and time expenditure, such as could not be hitherto achieved. Particular advantages of the invention consist further in the high safety and reliability as regards the carrying out of the whole work and as far as the provision of a uniform and clean gravel bed for the filter tubes, thus resulting in a well of great efficiency. Merely by way of example, it should be pointed out that the invention makes it possible to sink wells of a depth of 25 to 30 metres in sandy or clay soils in one to two hours, another hour or two being required to provide the well with a gravel bed of say up to 15,000 kg.

However the invention is in no way limited to the examples shown and illustrated, since the proposals which form the basic principle of the invention may be modified in any desired manner and since the method of the invention makes it possible to sink tubular wells of greater depth.

What I claim is:

1. A device for constructing a well in the ground, including a drilling tube, a closure member sealing the upper end, radially projecting cutters on the lower end of the tube, a well-pipe having a substantially smaller diameter than the tube and arranged concentrically and removably therein, means releasably connecting the well-pipe to the tube, said well-pipe having perforations in the lower end portion of the side wall thereof, said tube having perforations in the lower end portion of the side wall, and means for conveying a fluid under pressure to the well-pipe whereby the fluid flows from the well-pipe through the perforated lower end portions of the well-pipe and the tube to the space outside the tube.

2. A device according to claim 1, including boring members bracing the lower end portion of said well-pipe with respect to the lower end portion of said tube and secured to one of said end portions.

3. A device for constructing a well in the ground comprising a drilling tube, a well-pipe having a substantially smaller diameter than the tube and concentrically arranged therein, means releasably connecting the well-pipe to the tube, said tube and well-pipe each having perforations in the lower end portion of their side walls, an annular member embracing the well-pipe at the upper end portion thereof and slidably mounted within the tube to form a piston therein, a closure member sealing the upper end of the tube, conduit means adapted to be connected to a source of fluid under pressure and opening in the space of the tube between said closure member and said piston, a passage through said piston, a valve arranged in said passage, and control means connected to said valve and extending through the upper end portion of the tube.

4. A device according to claim 3, in which the closure member is a removable swivel head and includes two members rotatable with respect to each other, said conduit means extending axially through said swivel head.

5. A device according to claim 4, in which the valve control means includes a pull rope extending through said conduit means and through a fluid tight joint arranged in a lateral opening provided in said conduit means.

6. A device for constructing a well in the ground comprising a drilling tube having a closed upper end, cutting means radially extending from the lower end of the tube so that a bore-hole of larger diameter than the external diameter of the tube is formed, said tube having radial openings in the lower end portion of the side wall thereof at the level of the cutting means, a well-pipe of smaller external diameter than the internal diameter of the tube coaxially arranged within said tube and having radial perforations in the side wall of the lower end portion thereof and a closed lower end, means releasably fixing said well-pipe in the tube and including a member at the upper end of the well-pipe encircling the well-pipe and sealingly bracing said well-pipe in the tube, and means for connecting the tube to a source of fluid under pressure which flows through the well-pipe to the openings in the tube.

7. In a method of constructing a well bore of the gravel envelope type; the steps of introducing a drilling tube into the ground and drilling a bore therein thereby forming a free annular space around the tube; injecting water under pressure into said annular space at the lower end portion of the tube to thereby create an uprising stream of water in said space; introducing gravel under gravity action into said space in countercurrent with the uprising stream of water while rotatably withdrawing said drilling tube from the bore thereby imparting a whirling motion to the introduced gravel around the axis of the tube so as to erode the bore wall portion opposite the lower end portion of the tube as it is being withdrawn and so as to deposit the gravel in uniform concentric formation.

8. The method of claim 7, wherein the water is injected in an outward direction from the tube at the lower end portion thereof.

References Cited in the file of this patent

UNITED STATES PATENTS

| | | |
|---|---|---|
| 237,621 | Smith | Feb. 8, 1881 |
| 409,446 | Blaisdell | Aug. 20, 1889 |
| 846,226 | Medlock | Mar. 5, 1907 |
| 1,289,320 | Vaughan et al. | Dec. 31, 1918 |
| 2,018,283 | Schweitzer et al. | Oct. 22, 1935 |
| 2,290,127 | Johnson | July 14, 1942 |